UNITED STATES PATENT OFFICE.

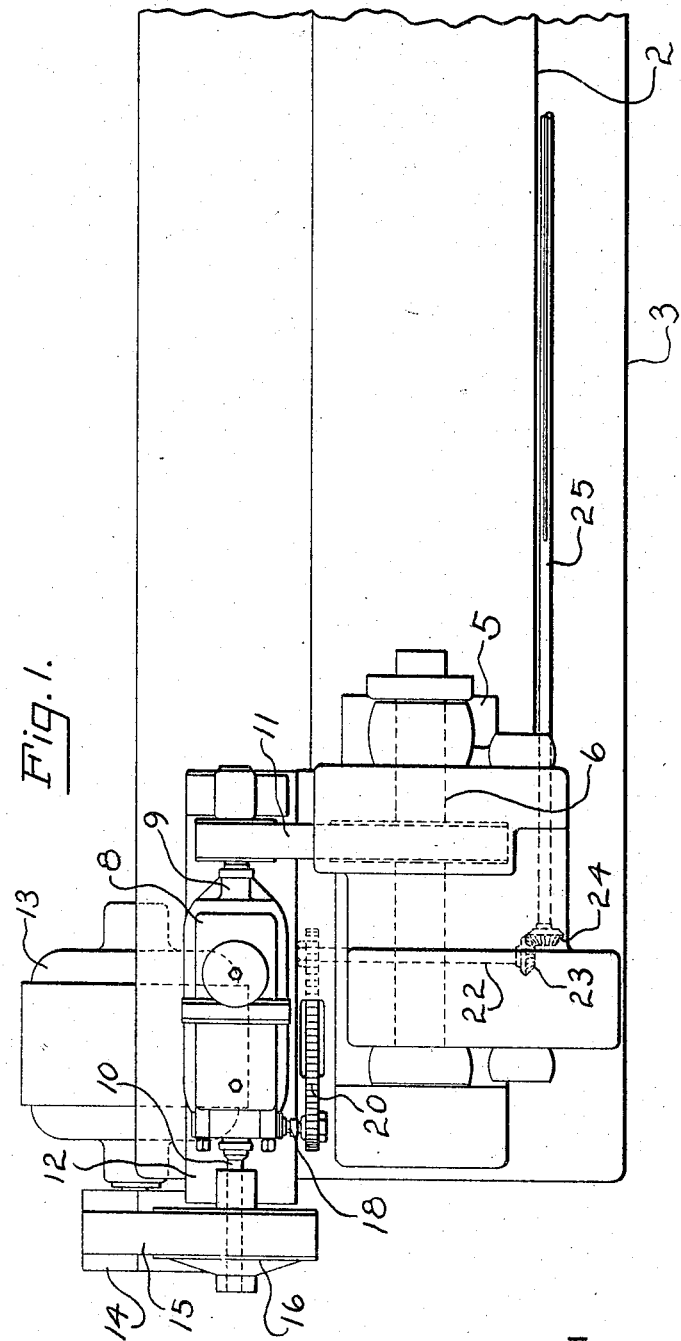

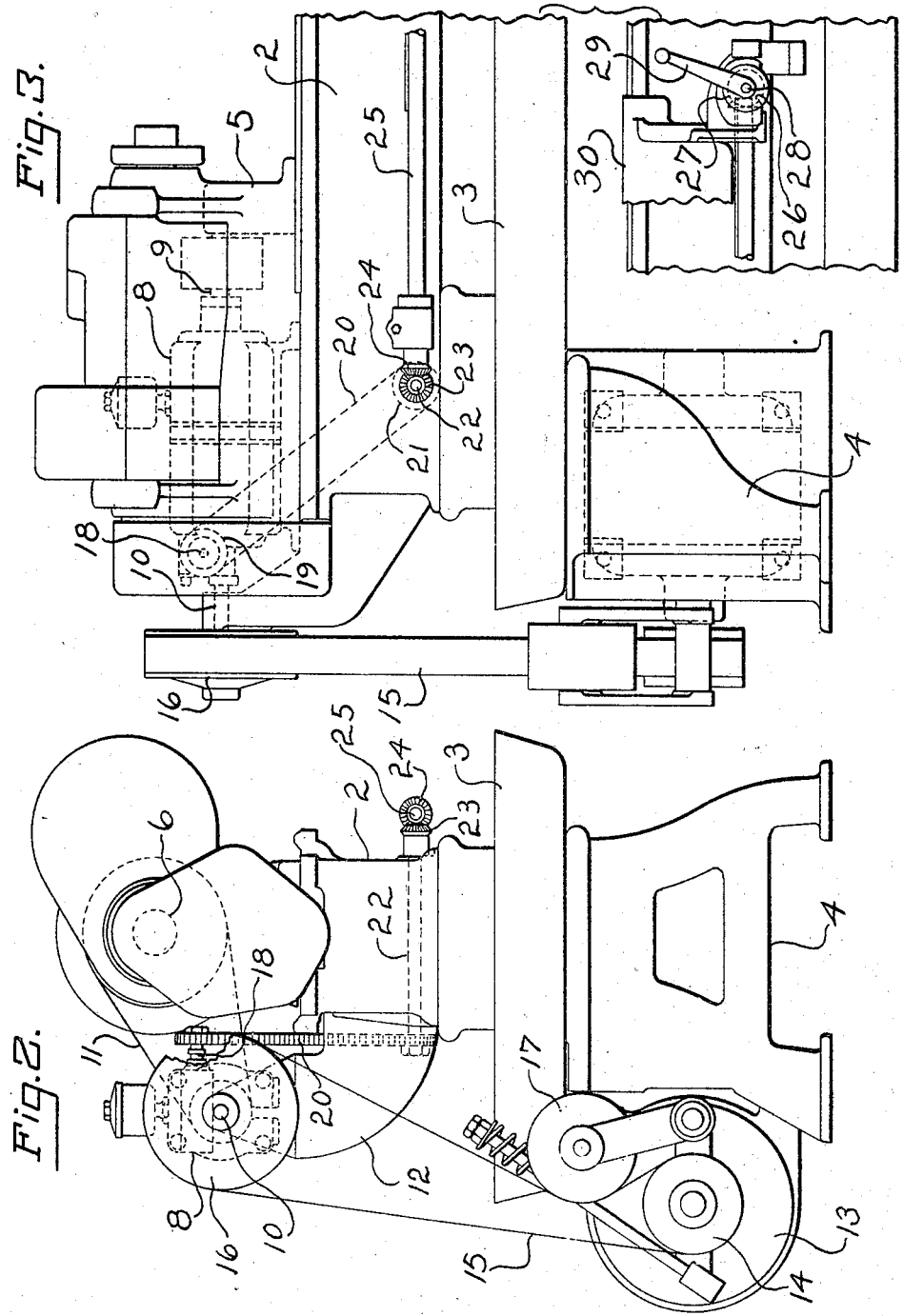

JOHN J. CRAIN, OF WATERBURY, CONNECTICUT, ASSIGNOR TO THE WATERBURY TOOL COMPANY, OF WATERBURY, CONNECTICUT, A CORPORATION OF CONNECTICUT.

DRIVING MECHANISM.

1,250,565.  Specification of Letters Patent.  Patented Dec. 18, 1917.

Application filed March 7, 1917. Serial No. 153,070.

*To all whom it may concern:*

Be it known that I, JOHN J. CRAIN, a citizen of the United States, residing at Waterbury, in the county of New Haven and State of Connecticut, have invented certain new and useful Improvements in Driving Mechanism, of which the following is a specification.

This invention relates to driving mechanism. Driving mechanism involving the invention can be employed with utility in connection with various kinds of machines, especially those for acting upon metal or wood. The mechanism, however, is of particular advantage when incorporated in a metal working machine such as a lathe. The primary object of the invention is the provision of means of an effective character by which the speed of a part such as a spindle can be readily governed, that is either increased or decreased, stopped or reversed.

In the drawings accompanying and forming part of the present specification I have shown in detail one convenient form of embodiment of the invention which will be set forth fully in the following description. I do not restrict myself to this exact disclosure; I may depart therefrom in several respects within the scope of the invention defined by the claims following said description.

Referring to said drawings:

Figure 1 is a top plan view of a lathe provided with driving mechanism involving the invention.

Fig. 2 is an elevation as seen from the left in Fig. 1 or similarly from Fig. 3.

Fig. 3 is a front view of said lathe furnished with said driving mechanism, the view being in two parts which are bracketed.

Like characters refer to like parts throughout the several views.

As I have already observed, driving mechanism involving the invention is susceptible of general use, although as may be inferred it is of particular utility when incorporated in or forming part of a metal working machine, it being shown as embodied in a lathe which will be briefly described in order to indicate the nature of the invention. Such a lathe comprises a base or bed 2 provided with the drip pan 3 and having the depending legs 4. The bed is equipped with the customary ways and supports at one end the head-stock 5 furnished with the live spindle 6 provided at its forward or inner end with the customary means for carrying the work or it may be anything else of a suitable nature.

As a part of the lathe or other suitable machine is what is known as a hydraulic variable speed gear 8. This hydraulic variable speed gear comprises a driven shaft 9 and a driving shaft 10. This hydraulic variable speed gear is a well-known instrumentality, being shown for instance in Letters Patent No. 924,787 to Reynold Janney for variable speed transmission device, dated June 15, 1909. The shaft 9 of it is operatively connected in some convenient manner with the spindle 6. For this purpose I have shown said shaft 9 connected with said spindle 6 by a belt 11 which is an advantageous way of securing the connection in question. It may not in all cases be necessary to use all the parts of the hydraulic variable speed gear. The latter may be supported in any desirable manner as by the bracket or bearing 12 projecting from the base or bed 2. When I speak of the fact that the shaft 10 is continuously driven, I mean that it is thus operated while the lathe or equivalent appliance is in action. The shaft 10 may be thus operated in any desirable way as by the electric motor 13, the armature shaft of which has a pulley 14 connected by the belt 15 with the pulley 16 on the shaft 10. It will, therefore, be clear that when the motor 13 is in action, the shaft 10 through the described parts will be driven. The electrical energy for the motor may be obtained in any desirable manner, for instance from a main (not shown). In connection with the belt 15 I may as shown best in Fig. 2, provide a spring slack take-up as 17.

As a part of the hydraulic variable speed gear 8 is a controlling member such as the shaft 18. This controlling member 18 is connected with a tilting box within the casing and constituting a part of the hydraulic speed gear. When the tilting box or regulator and the control shaft 10 which operates it are in the neutral position, the shaft 9 will not be turned even though the shaft 10. generally driven at a constant speed, be rotated. By moving the control shaft 18 in one direction, the driven shaft 9 will be operated at a progressively increased speed, whereas by moving the control shaft in the opposite direction, the reverse driving condition will ensue. As a consequence, therefore, through the operation of the control shaft 18 or some equivalent function, the shaft 9 and hence the spindle 6 operatively connected therewith for instance in the manner described, can be driven either forwardly or backwardly at predetermined speeds which will run from practically zero up within the capacity of the machine. I might state in this connection that the hydraulic variable speed gears are generally of such character as to effect the rotation of their driven shafts 9 at high speeds.

The hydraulic variable speed gear in the construction shown is located at the back of the machine, although it is governed in the organization illustrated from the front and practically near the tail end thereof as will hereinafter more particularly appear. I have shown the control shaft 18 as having fastened to the front end thereof the sprocket wheel 19 connected as by the sprocket chain 20 with the sprocket wheel 21 fixed to the shaft 22, the framework of the machine having bearings to support the two shafts. The sprocket wheel 21 is located at the rear of the shaft 22 which extends toward the front of the machine and as shown fixedly carries the bevel gear 23 in mesh with the bevel gear 24 fastened to one end of the shaft 25 extending longitudinally of the bed 2 and below the upper surface thereof. Splined or otherwise suitably associated with the shaft 25 is a bevel gear 26 in mesh with the bevel gear 27 fixed to the shaft 28 supported by suitable bearings on the carriage 30, said shaft 28 being furnished with a handle or crank 29 by which it can be turned. Through the manipulation therefore, of this hand crank or lever 29, the control shaft 18 through the intermediate described parts can be moved to the neutral position to stop the rotation of the shaft 9, or the control shaft 18 can be moved in opposite directions from the neutral to drive the said shaft 9 and hence the operatively connected spindle 6 in the desired direction and at the requisite speed. It will be clear that through the action of the crank 29 or its equivalent, the speed of the spindle 6 can be readily changed, that is either increased in speed or decreased, brought to a state of rest or driven reversely at the desired velocity.

What I claim is:

The combination of a spindle, a supporting bed for said spindle, a hydraulic variable speed gear supported by the rear end and head portion of the bed and comprising a driving and a driven shaft and also comprising a controlling member to vary the speed of or to reverse the driven shaft, a belt connecting said driven shaft with said spindle, a shaft on the front end of the bed, extending longitudinally of and supported by said bed, a second shaft extending depthwise of the bed, intermeshing bevel gears united to the respective shafts, belt gearing connecting the second shaft with the controlling member, the carriage having a bearing through which said first shaft is splined, a hand crank movable about an axis transverse to the first mentioned shaft and operatively connected thereto, and means for supporting the hand crank on the carriage.

In testimony whereof I affix my signature in the presence of two witnesses.

JOHN J. CRAIN.

Witnesses:
CHAS. P. HAIGHT,
C. E. HUMPHREY.